United States Patent [19]

Dean et al.

[11] 4,099,719
[45] Jul. 11, 1978

[54] SYSTEM AND METHOD FOR AUTOMATIC ALIGNMENT OF GUN WITH VIDEO DISPLAY

[75] Inventors: David W. Dean, Campbell; Stephen D. Bristow, San Jose, both of Calif.

[73] Assignee: Atari Inc., Sunnyvale, Calif.

[21] Appl. No.: 791,833

[22] Filed: Apr. 28, 1977

[51] Int. Cl.² .................................... F41F 27/00
[52] U.S. Cl. ........................... 273/101.2; 273/DIG. 28
[58] Field of Search ................. 35/25; 273/1 E, 85 G, 273/67, 101.1, 101.2, DIG. 28; 340/324 AD; 358/242, 230

[56] References Cited

U.S. PATENT DOCUMENTS

| | | | |
|---|---|---|---|
| 3,701,206 | 10/1972 | Ormiston | 273/101.1 X |
| 3,798,796 | 3/1974 | Stauff et al. | 35/25 |
| 3,815,913 | 6/1974 | Wren et al. | 273/101.2 X |
| 3,829,095 | 8/1974 | Baer | 273/101.1 |
| 3,838,856 | 10/1974 | Takeya et al. | 273/101.1 |
| 3,904,204 | 9/1975 | Yokoi | 273/101.1 |
| 3,960,380 | 6/1976 | Yokoi | 273/101.1 |
| 4,019,262 | 4/1977 | Breglia | 273/101.1 X |
| 4,035,841 | 7/1977 | Micek | 273/DIG. 28 |

*Primary Examiner*—Richard C. Pinkham
*Assistant Examiner*—Vance Y. Hum
*Attorney, Agent, or Firm*—Flehr, Hohbach, Test, Albritton & Herbert

[57] ABSTRACT

A system and method for operator alignment of a pointing device with a video target display wherein the gun is mounted to be deflected horizontally and vertically for aiming at all portions of the video display includes a first variable device coupled to the gun to provide a varying electric output therefrom in response to horizontal deflection of the gun and a second variable device coupled to the gun to provide a varying electric output in response to vertical deflection of the gun. These outputs control the positioning of an image of a shot on the video display. Each end of the operative range of electric outputs for each variable device is determined by comparing each output successively with each of a series of steps with the gun first pointed to one position of the display and then pointed to another position of the display. This operative range can then be divided equally into a predetermined number of shot positions on the display. In this way a given increment of displacement of the gun within the preestablished operative range can be accurately associated with a related increment of displacement on the display.

7 Claims, 7 Drawing Figures

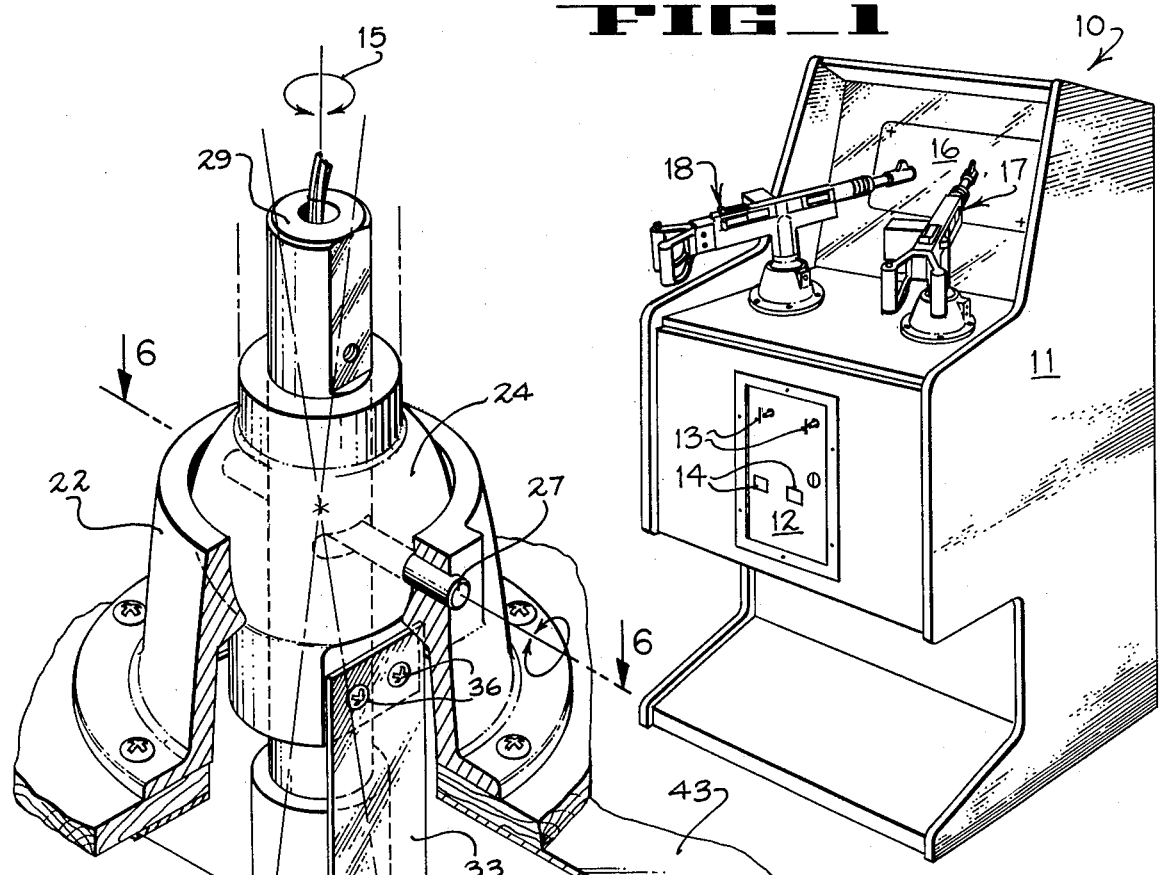
FIG_1
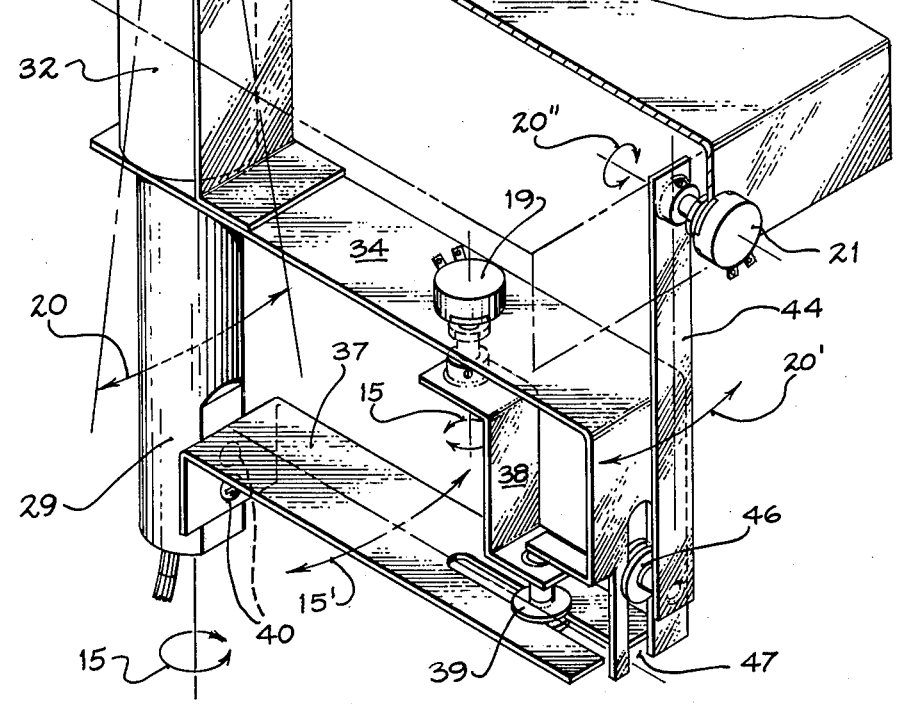
FIG_2

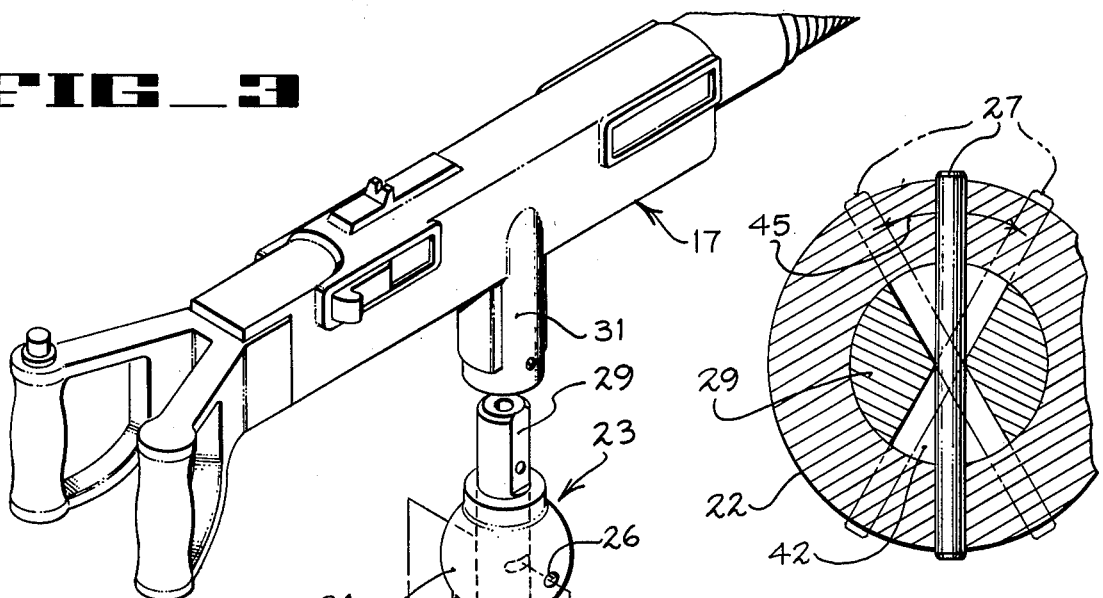
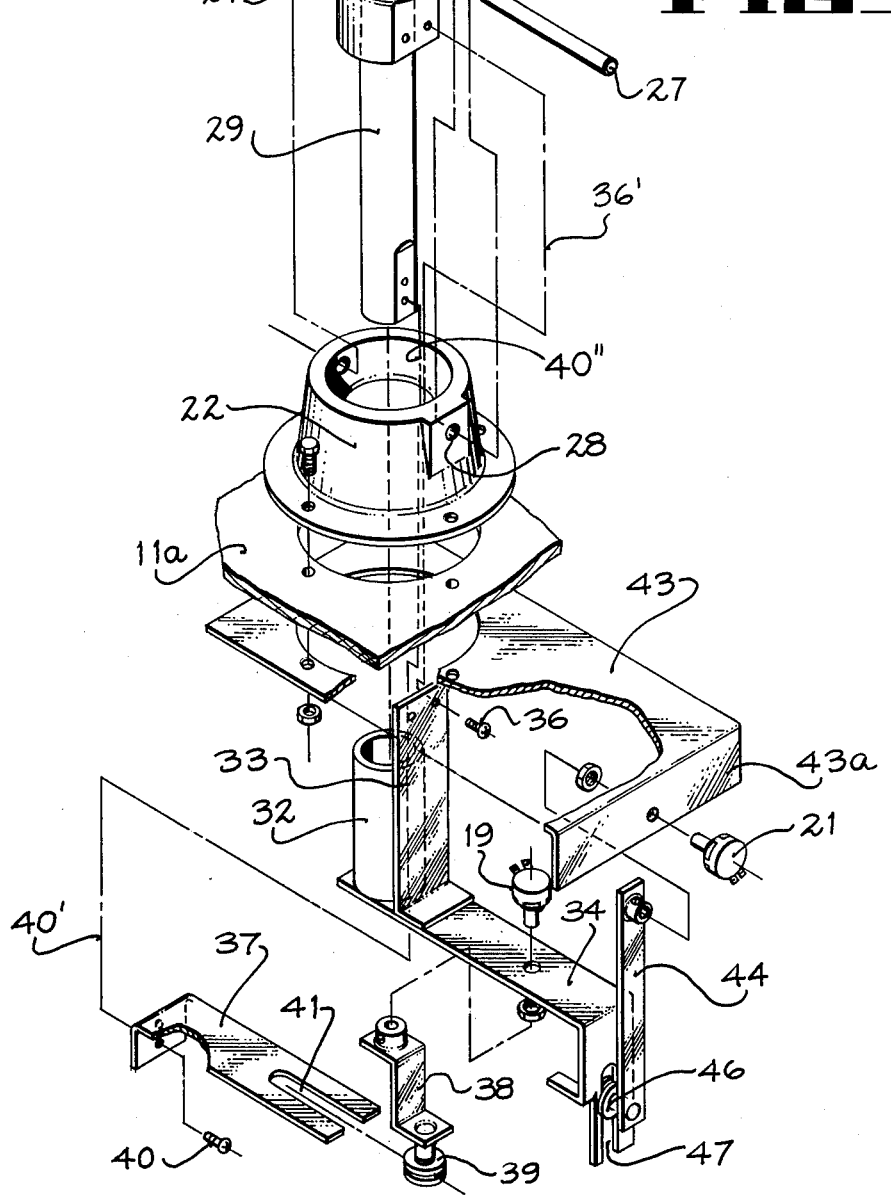

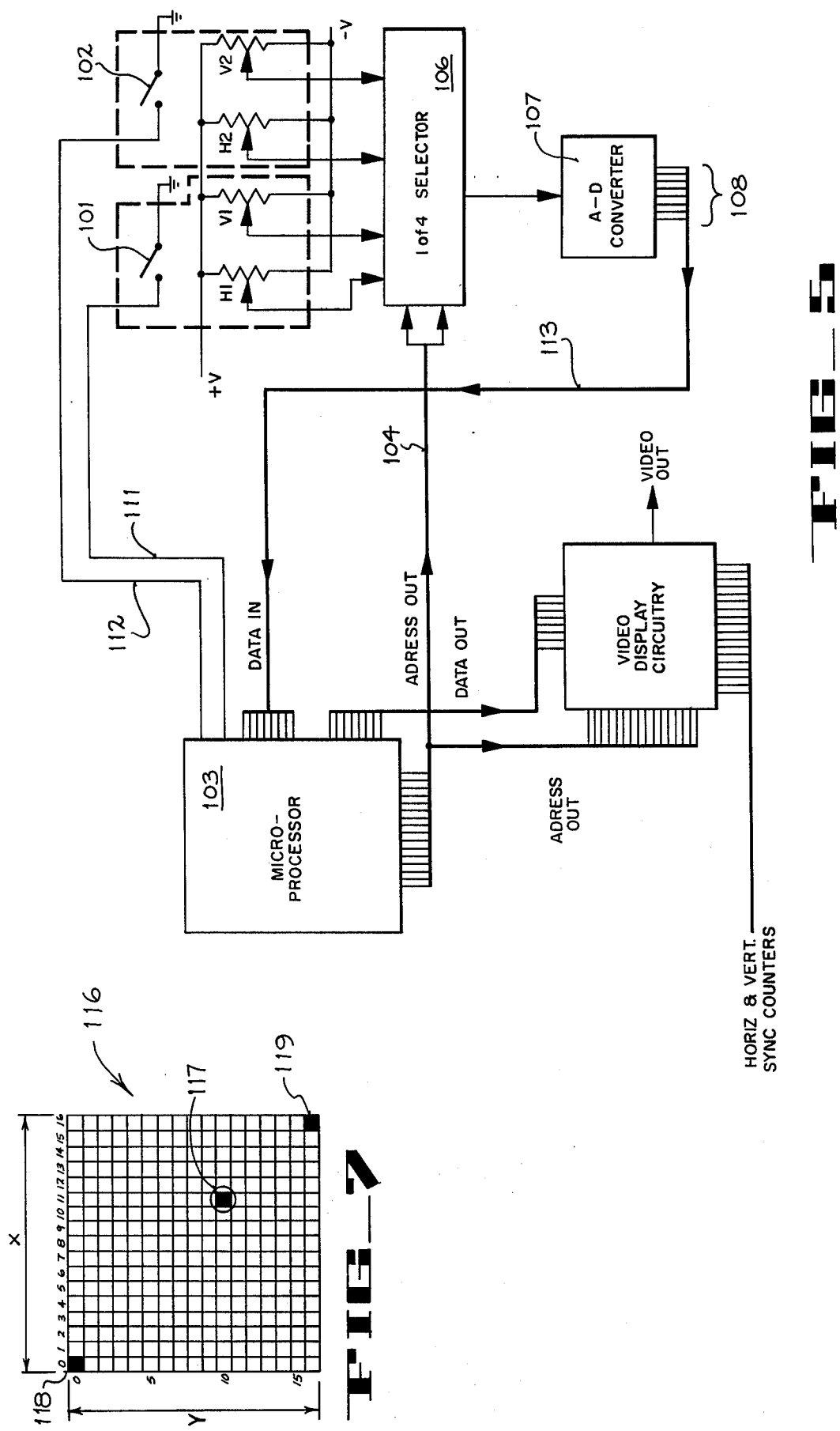

SYSTEM AND METHOD FOR AUTOMATIC ALIGNMENT OF GUN WITH VIDEO DISPLAY

BACKGROUND OF THE INVENTION

This invention pertains to a system and method for automatically aligning a gun with a video target display and is particularly useful in amusement game machines.

Previous games involving a target gun and video target display have employed a beam of light originating at the target for sensing by the gun. The foregoing types of gun/target games are highly sensitive to variations in brightness and contrast. Where a gun is to be mounted for X-Y deflection while varying a pair of potentiometers so as to dictate the location of a spot or "shot" on the screen, a trimming potentiometer is typically required in order to provide proper adjustment. This is because generally the tolerance, angular mounting position, and rotational range of the potentiometer are subject to manufacturing and assembly variances. It has been observed that adjustment of these trim potentiometers is required to be made often and typically requires a technician. Accordingly, there has been a need for a gun/video target alignment system of the latter type which requires no trim potentiometers and which eliminates the need for continuous calibration calculations of each potentiometer in normal gun operation.

SUMMARY OF THE INVENTION AND OBJECTS

In general, there is provided a gun and video display. The gun is mounted to be deflected horizontally and vertically for aiming the gun at all portions of the video display. A first variable electric device coupled to the gun provides a varying output therefrom in response to horizontal deflection of the gun while a second variable electric device coupled to the gun provides a varying output in response to vertical deflection of the gun. Means responsive to these outputs controls the positioning of an image of a shot on the video display. In addition to the above, means for comparing each output successively with each of a series of steps, with the gun first pointed to one corner of the display and then pointed at an opposite corner, serves to determine each end of the operative range of outputs for each electric device. This operative range can then be divided equally into a predetermined number of shot positions on the display. In this way a given increment of displacement of the gun within the pre-established operative range can be accurately associated with a related increment of displacement on the display.

It is an object of the present invention to provide an improved gun/video target alignment system and method for use by the operator of the gun.

Another object of the invention is to provide an alignment system and method of the kind described employing a microprocessor interposed between the gun and the video target display for accurately deriving the operative range of electric output devices associated with the guns (such as potentiometers), for use in accurate placement of an image of a shot on a video display.

Other objects of the invention will become more readily evident from the following detailed description of preferred embodiments when considered in conjunction with the drawings.

BRIEF DESCRIPTION OF THE DRAWINGS

FIG. 1 shows a diagrammatic perspective view of a coin operated amusement machine employing a pair of guns and a video target display according to the invention;

FIG. 2 shows a diagrammatic perspective view of a portion of the gun assembly of FIG. 3 in assembled relation according to the invention;

FIG. 3 shows a diagrammatic perspective exploded view of one of the gun assemblies;

FIG. 5 shows a system diagram according to another embodiment of the invention;

FIG. 6 shows a transverse plan section taken along the line 6—6 of FIG. 2;

FIG. 7 shows a diagram of a video display for purposes of explanation, according to the invention.

DETAILED DESCRIPTION OF PREFERRED EMBODIMENTS

Figure 4:
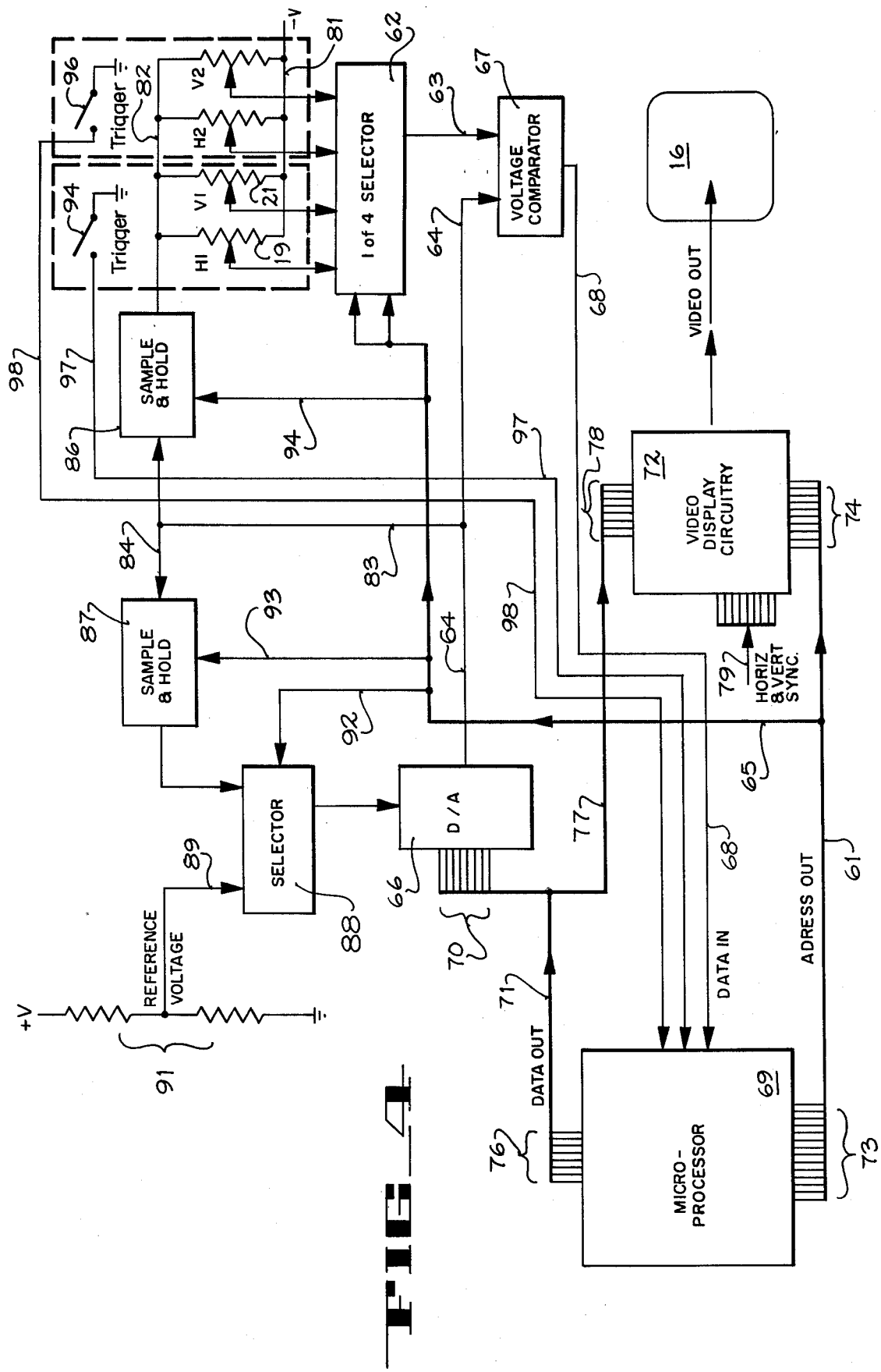
FIG. 4 shows a system diagram according to the invention.

The coin operated amusement machine 10 of FIG. 1 includes a cabinet 11 characterized by a conventional coin box 12 provided with a pair of coin slots 13 and coin return drops 14.

A video target display 16 is disposed ahead of the muzzles of a pair of simulated machine guns 17, 18, which can only be pointed at the target on display 16.

Each of guns 17, 18 is mounted so that it can swing from side to side and up and down. In this way each of the two guns is arranged to be able to point to all portions of the video target display 16.

While two guns can be employed in the machine as shown, only a single gun will be explained in detail, it being understood that both guns operate in the same manner and that further explanation is not required.

The physical position or orientation of the gun barrel serves to establish where a shot from that gun will be caused to appear on the video display. In general this is accomplished by means of a microprocessor which controls video display circuitry of known type for generating a spot on the video display.

From the foregoing it will be evident that a system of the kind described is readily subject to mechanical and electronic misalignment so that a spot can appear on the video display at a point off-set from the projected image of the end of the muzzle of the gun. It is important to correct this off-set in order to achieve accuracy with the gun. Thus, means are provided herein for automatically aligning the gun position with predetermined locations on the target corresponding to maximum and minimum angular displacement of the gun so as to align the gun to fire accurately over the entire target.

The position of the spot appearing on the target display represents a burst or "shot" made from the gun. The position of the "shot" is primarily derived from the condition of a pair of potentiometers 19, 21 which respectively indicate the horizontal and vertical positioning of gun 17.

Gun 17 is mounted and movable in a manner so as to adjust the wipers on each of potentiometers 19, 21 in response to gun movement. A stationary base mount 22 secured to the top deck 11a of cabinet 11 contains a ball joint assembly 23 comprising a ball joint element 24 formed with an opening 26 adapted to receive a pin 27 therethrough. Pin 27 also extends through pin openings 28 of base mount 22 for supporting assembly 23.

Element 24 includes a longitudinal central opening formed downwardly therethrough containing a mounting post 29. Post 29 includes a transverse opening 42 (FIG. 6) for receiving pin 27 therethrough. Post 29 is formed with relieved portions on both sides of opening 42 to permit post 29 to rotate through a limited arc 45 while pin 27 retains post 29 vertically.

Gun 17 carries a sleeve 31 adapted to fit over the top of mounting post 29 to be bolted thereto via the openings thereshown when aligned. A lower sleeve 32 receives the lower central portion of mounting post 29 passing therethrough while serving to guide and support same while permitting post 29 to rotate with respect to sleeve 32.

Means for retaining sleeve 32 onto the lower end of mounting post 29 comprises the bracket 33 extending upwardly from, and attached to, a transversely extending operator arm bracket 34. The upper end of bracket 33 is secured by screws 36 to a flat formed on the lower end of ball joint element 24.

Means for varying the wiper of the potentiometer 19 in response to horizontal movement of gun 17 includes the laterally extending operator arm 37 attached by screws or rivets 40 to protrude radially from the lower end of mounting post 29. Potentiometer 19 on bracket 34 carries a wiper extension arm 38 constructed to include a roller 39 on its distal end adapted to move within a slot 41 defined by the bifurcated end portion of operator arm 37.

Accordingly, as post 29 rotates relative to the substantially stationary bracket 34 operator arm 37 will move the wiper extension arm 38 to change the position of the wiper of potentiometer 19.

Means for adjusting the potentiometer 21 (representative of the vertical orientation of gun 17 relative to the video target display 16) comprises a stationary mounting plate 43 attached beneath deck 11a and formed with a downwardly depending edge margin 43a to support potentiometer 21 therefrom. Potentiometer 21 includes a wiper extension arm 44 arranged to carry a roller 46 to ride in slot 47 of the bifurcated end of the transversly extending operator arm bracket 34.

Thus, as ball joint element 24 pivots with mounting post 29 about the axis of pin 27, operator arm bracket 34 will move relative to stationary mounting plate 43 so as to cause roller 46 to move between advanced and retracted positions along slot 47. The foregoing movement serves to adjust potentiometer 21 in accordance with the particular angular vertical displacement of gun 17.

Similarly, lateral angular displacement of gun 17 serves to rotate post 29 within the limits permitted by opening 42 and pin 27 therein so as to cause operator arm 37 to vary the position of wiper extension arm 38. Thus, each of guns 17, 18 is mounted so that it can swing laterally about the axis of support post 29 in the direction of arrows 15 to move an operator arm 37 along arc 15'. This moves wiper extension arm 38 along arc 15". Thus, deflection of gun 17 in a horizontal plane varies the setting of potentiometer 19. Guns 17, 18 are also mounted so that they can be deflected in a vertical plane about the pivot axis defined by pin 27 for movement in the direction of arrow 20. This moves the operator arm 34 to rotate wiper extension arm 44 along arc 20'. Thus, angular deflection of gun 17 in a vertical plane varies the setting of potentiometer 21.

In the system shown in FIG. 4, potentiometers H1, V1 represent potentiometers 19, 21 employed in gun 17.

H2 and V2 represent corresponding potentiometers for the second gun of the two gun game shown in FIG. 1.

Calibration (or alignment) of the orientation of gun 17 (or 18) with respect to the position of an image representation of a shot from the gun as it appears on the video display is very simply and reliably established by the operator of the gun by a simple procedure.

In general, and as explained in detail further below, when the computer 69 reads the potentiometer position in a measuring mode it will off-set the "position voltage" by a positive adjustment. It will also control the gain of the digital to analog convertor 66 by selector 88 so that an "all 0's" reading from the circuitry corresponds to a minimum angle of the gun and an "all 1's" reading corresponds to a maximum angle regardless of the original set-up and gain of the potentiometer system.

Initially, in response to suitable alignment test switch activation the microprocessor generates, in known style, a sequence of viewable operator instructions which appear on video display 16. The operator is directed to point his gun to one corner such as to the extreme upper left hand corner of display 16 and then to pull the trigger 94. The operator is then directed to point his gun to the corner opposite the first corner, such as to the extreme lower right hand corner and again pull the trigger.

These movements cause each potentiometer 19, 21 to be moved through its maximum usable displacement to define the operative range of the output for each potentiometer. The term "operative range" merely means that range of outputs which can be provided by movement of the gun to its maximum displacement while still pointing at a portion of display 16 rather than the range of outputs achievable by the potentiometer per se when disassociated from the system.

The alignment procedures within the system are commenced by trigger 94. Thus, trigger 94 serves, in fact, to function as a simple switch for sending a ground (or other) signal to a microprocessor 69 via lead 97 to commence the sequence of steps now to be described.

In following the operator instructions the person aligning the gun will first direct the gun 17 to that corner of display 16 which will, of necessity, move the wiper of H1 and V1 to its minimum output position. The value of this minimum output is then determined by a sequence of comparisons until cross-over is detected whereby the output value associated with cross-over is then stored.

The maximum usable output is next determined in a broadly similar manner. Thus, by knowing the minimum and maximum outputs the operable range of outputs from H1, V1 can be established. The display includes only a predetermined number of shot "positions" available to register a "shot" from the gun. Dividing the operable range by the number of shot positions available on the display provided the degree of change in the output of H1 or V1 for each incremental change in spot position.

The operable range for each of the four potentiometers H1, V1, H2, V2 is established in sequence by successively addressing the 1 of 4 selector circuit 62 to select the four potentiometers in sequence. Each of the two guns is aligned separately. For gun #1, H1 and V1 are selected sequentially. Then, for gun #2 H2 and V2 are selected sequentially. Microprocessor 69 generates the addresses onto lines 61, 65. The addresses are cycled from left to right through a 1 of 4 selector circuit 62 of known construction so that the output on lead 63 from selector circuit 62 sequentially represents the output from the four potentiometers.

During the minimum determination a voltage is placed across the potentiometers by means of digital to analog converter 66 and sample and hold circuit 86. Circuit 86 serves to apply the voltage at one extremity of each of the potentiometers. A fixed source voltage (−V) is coupled to the other extremity of each of the potentiometers. The minimum output for one potentiometer is derived before establishing the next minimum output.

Each of the two guns are aligned separately. H1 and V1 for gun #1 and H2 and V2 for gun #2 are aligned sequentially.

The 1 of 4 selector and subsequent sequential scanning could be eliminated by duplicating the D/A converter section four times at extra cost. However, the computer can scan the potentiometers sequentially fast enough so that the sequential nature of the scanning is not apparent to the operator. Also, in the present instance 66, 67 and 69 perform additional functions.

The voltage on lead 63 is to be compared with the voltage on lead 64 derived from the digital to analog converter 66. So long as the voltage on lead 63 is greater than on lead 64 the output will not have reached a minimum, and as a convention, the output state on lead 68 will be "low" so long as the voltage on lead 63 is greater than on lead 64. A microprocessor 69 is arranged in known manner to respond to a change in this state, i.e. to respond to a "high" on lead 68.

As each "low" output is fed back to microprocessor 69, microprocessor 69 generates the next step or level of voltage represented in binary style at the 8-bit output 76. The microprocessor should be set to commence its initial digital output (via cable 71) at 0 so that the next step (in response to sensing the first "low" on line 68) is represented as a "1" in binary form at the 8-bit output 76.

This same digital signal is detected at the 8-bit binary input 70 of the digital to analog (D/A) converter 66 whereby an output voltage will be generated onto lead 64 to be compared with the voltage on lead 63. The above stepping sequence continues until the voltage on lead 64 exceeds the voltage on lead 63 to cause the output on lead 68 to go "high" as noted above. The microprocessor recognizes this change or "cross-over" and notes the value of the operative pot voltage as being then equal to that of the digital to analog converter. The microprocessor at that point stores the decimal input value of the digital to analog converter since this value then corresponds to a predetermined displacement of the gun, i.e. the minimum angular displacement.

In this way the voltage comparator 67, digital to analog converter 66 and microprocessor 69 are employed together to determine the respective minimum operative values of each of the potentiometers by sampling signals taken from each of the potentiometers until the cross-over point is reached.

The means for disposing the image of a shot on a video display 72 comprises the 16-bit output address channels 73 coupled via line 61 to the 10-bit input address 74 which serves to locate the position for the shot to appear. The number of bits used can vary depending on desired resolution of the display. The shot data such as data for the initiation of the shot itself is supplied from the microprocessor 8-bit output 76 fed via lines 71, 77 to the 8-bit input 78.

Video display circuitry 72 is of known type and controlled by conventional digital horizontal and vertical sync pulses at 79.

The foregoing means serves to define the "operative" range for the voltage output from each of the potentiometers. Thus, the foregoing provides the basic means for correcting the problem where the gun is mechanically out of alignment with the machine on which it rests or where it is electronically out of alignment with the television display to which it is directed. In order to fully correct any alignment error so that the gun will shoot where it is aimed, the following procedure is involved.

Initially it is to be observed that two procedures are required for each of the potentiometers to be fully aligned with the video display. These procedures are carried out as the muzzle of the gun (which the potentiometer represents) is directed to opposite corners of the display.

In general, the first procedure for aligning one of the potentiometers, such as H1, is to attempt to establish zero output voltage on the wiper of the potentiometer when the gun is directed towards one of the horizontal (or vertical) extremes on the video display. In the present instance the gun would be directed, for example, to the extreme right hand edge of the diplay to establish minimum lateral displacement.

It is to be noted that (−) V voltage is on the common line 81 and that as the voltage on the common line 82 increases relative to (−) V the voltage at the wiper for H1 at some point in time will become 0.

Initially, it is to be noted that H1 must necessarily be below 0 by virtue of the extreme position of the wiper. The microprocessor generates its first count of "1" to be transmitted to the D/A converter to provide an analog voltage on line 64 as the 0 voltage step. The 0 voltage step is coupled by line 83 to the lead 84 to be fed into sample and hold circuit 86 of conventional construction. Accordingly, circuit 86 retains 0 voltage on line 82 for purposes of comparison. In this condition the 0 voltage remains on line 64 for comparison by means of comparator 67.

As above explained microprocessor 69 serves to detect when there is a change in the state of the output on lead 68. As the output of the digital to analog converter is greater than 0 and the potentiometer output is necessarily less than 0 there is no equality and the microprocessor accordingly advances to supply a second step input to D/A converter 66 via lead 71. This second step increases the voltage on line 82 by an increment as this increased voltage is fed to circuit 86. Having provided the increased comparison voltage to circuit 86 it is now possible to return the voltage on line 64 to the zero voltage for comparing the voltages on leads 63 and 64 at comparator 67. So long as the output remains "low" on lead 68 microprocessor 69 sends an additional stepping pulse to converter 66 which continues to step to the next higher voltage on line 64. Each next higher voltage is sensed by circuit 86 for purposes of retaining the increased voltage on lead 82 for comparison purposes and, as noted above microprocessor 69 again returns the voltage on lead 64 to 0 by known means via the leads 71.

An additional comparison is made and ultimately following this procedure at some point in time the output on lead 68 will go from one state to the other and microprocessor 69 will thereby determine that the cross-over point has been reached and the voltage for line 82 determined for maintaining 0 voltage at the wiper of H1. This value is then stored and (for H1) represents one end of its operable range.

The foregoing represents the first procedure in aligning H1. The system has now found the voltage that produces 0 output voltage from the potentiometer and stored this voltage.

The second procedure is as follows.

Initially gun 71 is deflected to the opposite extreme of the video display, i.e. the corner opposite the first.

While reference has been made to H1 (Horizontal potentiometer 19) and the manner of adjusting it, it should be readily evident that by directing the gun 17 to a corner, the minimum voltage output for vertical movement of gun 17 will be achieved in the same manner after V1 is coupled via selector 62 to lead 63.

In pursuing the second phase of establishing appropriate alignment between the gun and the video display the object is to establish the maximum output voltage from the D/A converter at a level corresponding to the positioning of the gun at the opposite corner of the video display.

After having moved the gun 17 to point at the opposite corner its associated potentiometers H1, V1 will have been moved to their maximum operable displacement. Under these circumstances the voltage output on lead 63 is determined as follows for the potentiometers in their new position. This is accomplished by means of the D/A converter 66 and sample and hold circuit 87 operating in a loop through a one of two selector circuit 88.

The object here is to gradually increase the output voltage of the D/A converter 66 until it exceeds that on lead 63 so as to change the output state on lead 68. Microprocessor 69 will then know that the point has been reached where the maximum voltage corresponds to the maximum gun position.

The circuit will first store in sample and hold 86 the voltage via 66 that will produce 0 voltage output when the gun is at the minimum angle. Because the gun is now at maximum angle there will be a voltage which is not equal to 0 on line 63. The computer 69 will then adjust the reference input to the digital to analog converter 66 via the selector, 88, and sample and hold circuit 87 so that for an all "1's" input to the digital to analog converter the output of the digital to analog converter will equal the voltage output of the potentiometer at full angle.

This is done as follows:

After storing the minimum position for zeroing voltage in sample and hold 86, the binary output at 76 provides cable 71 with a first binary number representative of the lowest voltage (in binary form) transmitted via cable 71 to inputs 70 at converter 66. This provides an output via leads 64, 83 and 84 which is retained in sample and hold circuit 87. This voltage is an initial attempt at setting the gain of the digital to analog converter 66. After obtaining this value of voltage in circuit 87 the inputs to D/A 66 are all converted to binary "1's" to provide the maximum output voltage from the D/A converter for purposes of comparison at comparator 67.

The output of comparator 67 (if the state remains the same) causes microprocessor 69 to generate the next greater binary number on lead 71 for transmission to the D/A converter. At input 70 this second step in the process generates a second output voltage from the D/A converter to be held in the sample and hold circuit 87 via leads 64 and 83. Having recorded a second analog voltage level in circuit 87 processor 69 transmits all binary "1's" to input 70 for operating the D/A converter at maximum output voltage. This maximum output voltage is then compared at comparator 67 to detect the change in state. Ultimately a change in state will be detected on lead 68 by processor 69 and the voltage then in circuit 87 will represent the cross-over voltage at the extreme position for a gun associated with a given potentiometer (H1, V1). This information is stored by the processor to establish the gain control voltage for a given one of the potentiometers.

Finally, a fixed reference voltage is provided on lead 89 from the voltage divider 91 so as to provide a known control voltage for the entire system. During those portions of the procedure wherein each incremental step of the D/A converter 66 has been activated to provide a voltage on line 64, as in determining the minimum pot position detection and storage, the reference voltage is employed from voltage divider 91 via selector 88. An address appearing on lines 61, 65 operates selector 88 via the connection 92. During those times the A/D gain is being controlled the reference is from sample and hold circuit 87 via selector 88.

Thus, processor 69 prior to generating each successive binary number from its output 76 for controlling converter 66 also generates an address at output 73 onto address lines 61, 65 for switching selector 88 to couple lead 89 to converter 66. After this step, and as noted above, all of the inputs at 70 are changed to the binary number code to set the gain of D/A 66 under control of processor 69. At that time an additional address is generated at 73 for transmission to selector 88 to couple sample and hold circuit 87 to converter 66 and to decouple the reference voltage at that time. In short, the reference voltage is connected to converter 66 for the incremental stepping thereof but the voltage maintained in sample and hold circuit 87 is coupled to converter 66 when converter 66 is providing its maximum output for comparison.

As processor 69 is incrementing converter 66, it also provides an output control via output 73 on lines 61, 65 to "enable" sample and hold circuit 87 via lead 93 so that the output voltage of converter 66 for that particular increment of voltage will be stored in circuit 87 for later use in providing the comparison voltage.

Similarily, as to the first procedure and in response to each incrementing of converter 66 an enabling address is provided via line 94 to sample and hold circuit 86 to set the 0 voltage reference for the potentiometer to be read.

According to another embodiment shown in FIG. 5, in response to the closure of one or the other of the triggers 101, 102 a microprocessor 103 is conditioned to run a program in which the operative limits of each of the potentiometers is to be established relative to the projected image of a gun barrel on a video display as follows.

Processor 103 provides addresses on line 104 to commence cycling the selector circuitry 106 whereby each of the potentiometers is coupled in sequence to an analog to digital converter 107 for first aligning H1, V1 for gun #1 and then H2, V2 for gun #2. Converter 107 provides an 8-bit binary output 108 representative of the voltage established by the position of a wiper of each of the associated potentiometers. This information is then recorded for the extremes of movement of the gun barrel relative to the edge of video display 16 and these extremes are recorded in digital form in processor 103.

Having established the two extreme positions processor 103 then runs a program to sub-divide the displacement between the extreme voltages by that number of possible gun shot positions which can appear on a video display. For example sixteen positions can be easily used, and in this way the processor sub-divides the video display into a matrix of 16 × 16 where each shot can occur.

The video display circuitry read-out is as above-described.

From the foregoing it will be readily evident that there has been provided an improved system and method for aligning a gun or other pointing device relative to a video display so that the display will provide an image accurately disposed on the display at a position thereof corresponding to the position at which the pointing device is directed.

While the present invention has been described in terms of a "gun" inasmuch as the gun embodiment would be a likely utilization of the invention, it is readily evident that the term "gun" as used herein is intended to include all manner of pointing devices. For example, in a video quiz game where responses are selected by being pointed at with a pointer mounted in the manner of the guns noted. In such instance the configuration of the pointing device quite likely would not be in the form of a gun but in the form of some other article.

While the gun is described as movable along both an X and Y axis (or horizontal and vertical), in the event that a display should require movement in only a single direction or only along one axis, the invention as disclosed herein can still be used to provide alignment between a pointing device and such display.

Further, if storage of the numbers noted above for aligning a gun system employs standard means of a type that does not need line power to function (via a battery backup) the system can be programmed at the factory with little labor and need only be reprogrammed when the end user decides that he wants to improve the accuracy of the system.

In a machine of the kind described in which the image on a video display is defined by the orientation of a pointing device and in which the display has a predetermined number of positions at which an image can be presented thereon disposed along an axis defined between first and second predetermined positions the method of aligning the position of an image appearing on a video display with the position of the display at which a pointing device is directed comprises the steps of pointing the device at the first predetermined position on the display, detecting in digital form a value represented by the first predetermined position, pointing the device at the second predetermined position on the display, detecting in digital form a value represented by the displacement of the second predetermined position from the first predetermined position along a given axis, and establishing in digital form the value of the displacement along the axis named. The next step is to subdivide the displacement value by the predetermined number of positions lying along the axis to associate a proportionate amount of the displacement value with the displacement of each of the predetermined number of positions (at which an image can be presented) from one of the first or second predetermined positions along the axis.

With reference to FIG. 7 a 16 × 16 grid or matrix represents a predetermined number of positions on a video display 16 where an image 117 of a shot can appear. The position of image 117 is defined by its displacement along both the X and Y axes from a predetermined position such as 0,0. When gun 17 or other pointing device is directed at the same position as image 117, image 117 will appear at the location shown only if the pointing device is properly aligned with display 16.

Matrix 116 has a predetermined number of positions thereon disposed along each of two axes (X and Y) between first and second predetermined positions, such as positions 0,0 and 16,16 for defining the extreme displacement along both the X and Y axes.

As noted above, in carrying out the method the first step is to point the gun 17 at the first predetermined position in the display such as position 118. A value represented by the first predetermined position 118 is then detected in digital form by the means noted above. Subsequently the gun 17 is pointed at a second predetermined position 119 on display 16 and a value represented by the displacement of the second predetermined position from the first predetermined position along a given axis, such as along the X axis or the Y axis is then detected in digital form as above described. A further step is then employed of establishing in digital form the value of the displacement along the axis and then that displacement value is subdivided by the predetermined number (17) of positions lying along the axis to associate a proportionate amount of the displacement value with the displacement of each of the predetermined number (17) of positions from either position 118 or 119 and as measured along one or the other of the two axes X or Y.

We claim:

1. In a video game having a video display and a pointing device supported to be pointed at positions on said display, said display having a predetermined number of positions thereon disposed along an axis between first and second predetermined positions thereof and at which an image can be presented, means responsive to movements of the device to provide an image on said display defined by such movements and for aligning the position of the image with the position of the display at which the device is pointed comprising variable means coupled to said pointing device to provide a variable electric output in response to displacing said pointing device between said first and second predetermined positions on said display, means serving to provide in digital form a first value of the output of said variable means with the pointing device directed at one of said predetermined positions to define a first portion of the operative range of said electric output, and means serving to provide in digital form a second value of said output of said variable means with the pointing device directed at the other of said predetermined positions of said display to define a second portion of the operative range of said electric output, means defining the difference between said first and second values, and means for subdividing said difference by said predetermined number of positions lying along said axis to associate a proportionate amount of said difference with the displacement of each of said predetermined number of positions from one of said first and second predetermined positions.

2. In a video game according to claim 1 in which said variable means includes a potentiometer coupled to vary its output in response to movements of said pointing device, said means for providing first and second values of the output of the potentiometer including comparing means and a digital to analog converter for supplying an output to said comparator, means coupled to sense the output state of the comparator and for supplying a series of digital inputs to said digital to analog converter in response to continued sensing of a given state of said comparator and to cease supplying said series of inputs in response to sensing a change in the output state of the comparator.

3. In a video game according to claim 1 in which said variable means includes a potentiometer coupled to vary its output in response to movements of said pointing device, said means for providing first and second values of the output of the potentiometer including an analog to digital converter coupled to the output of said potentiometer for supplying said values in digital form to said means defining the difference between said values.

4. In a video game having a video display and a pointing device supported to be pointed at positions on said display, said display having a predetermined number of positions thereon disposed along an axis between first and second predetermined positions thereof and at which an image can be presented, means responsive to movements of the device to provide an image on said display defined by such movements and for aligning the position of said image with the position of the display at which said device is pointed comprising at least one variable device coupled to said pointing device to provide a variable electric output in response to displacing said pointing device between said first and second predetermined positions on said display, means for generating each of a series of signals of incrementally increased output values for comparison with said variable electric output, means for comparing said variable electric output of said variable device with said output values while said pointing device is directed to said first predetermined position, means for sensing the transition point at which said output comparison value exceeds the value of said variable electric output of said variable device to define one end of the operative range of said variable device, means for storing the value of said transition point, means for generating decreasing output values for comparison with said variable electric output until said decreasing output value becomes less than the value of said variable electric output while said pointing device is directed to a second predetermined position on said display, means for sensing the transition point at which said output comparison value becomes less than the value of said variable electric output of said variable device to define the other end of the operative range of said variable device, and means for subdividing the operative range defined between said ends by the number of positions on said display at which an image of the end of said pointing device can appear to associate a proportionate amount of said range with the displacement of each of said number of positions from one of said first and second predetermined positions.

5. In a video game having a video display and a pointing device supported to be pointed at positions on said display, said display having a predetermined number of positions thereon disposed along an axis between first and second predetermined positions thereof and at which an image can be presented, means responsive to movements of the device to provide an image on said display at positions defined by such movements and for aligning the position of the image on the display with the position of the display at which the device is pointed comprising variable means coupled to said pointing device to provide a variable electric output in response to displacing said pointing device between said first and second predetermined positions on said display, means for generating and comparing each of a series of output values with the value of said electric output until cross-over is detected while directing said pointing device at one of said predetermined positions and for storing the value detected at cross-over to represent the output value associated with positioning said pointing device at said one of said predetermined positions, means for generating and comparing each of a series of output values with the value of said electric output until cross-over is detected while directing said pointing device at the other of said predetermined positions and for storing the value detected at cross-over to represent the output value associated with positioning said pointing device at the other of said predetermined positions, means defining the difference between the first and second stored values to define an operative range of output values associated with the displacement of said image between said first and second predetermined positions, and means for subdividing said difference by said predetermined number of positions lying along said axis to associate a proportionate amount of said difference with the displacement of each of said predetermined number of positions from one of said first and second predetermined positions.

6. The method of aligning the position of an image appearing on a video display with the position of the display at which a pointing device is pointed where the position of the image is defined by the orientation of said pointing device and where the display has a predetermined number of positions thereon disposed along an axis between first and second predetermined positions and at which an image can be presented, the steps comprising pointing the device at said first predetermined position of said display, detecting in digital form a value represented by said first predetermined position, pointing said device at a second predetermined position on said display, detecting in digital form a value represented by the displacement of said second predetermined position from said first predetermined position along a given axis, establishing in digital form the value of said displacement along said axis, subdividing said displacement value by said predetermined number of positions lying along said axis to associate a proportionate amount of said displacement value with the displacement of each of said predetermined number of positions from one of said first or second predetermined positions along said axis.

7. In a video game having a video display and a pointing device supported to be pointed at positions on said display said pointing device being mounted to be deflected horizontally and vertically for aiming the pointing device at all portions of the video display, a first variable electric device coupled to the pointing device to provide a varying output therefrom in response to horizontal deflection of the pointing device, a second variable electric device coupled to the pointing device to provide a varying output in response to vertical deflection of the pointing device, means responsive to said first and second named outputs to control the positioning of an image of a shot on the video display, means for comparing each output successively with each of a series of output steps, means for generating a series of output steps with the pointing device first pointed to one corner of the display and then pointed at an opposite corner for determining each end of the operative range of outputs for each electric device, means for dividing the operative range of each said electric device equally by a predetermined number of image positions on the display to associate a given increment of displacement within said operative range accurately with a related increment of displacement on the display.

* * * * *